June 19, 1956  J. H. C. ANDREW  2,750,717
HONING DEVICE

Filed June 10, 1955  3 Sheets-Sheet 1

Inventor
John Hector Cowley Andrew
By Lennie, Edmonds, Marston, Burrows & Ingle
Attorneys

United States Patent Office 2,750,717
Patented June 19, 1956

2,750,717

HONING DEVICE

John Hector Cowley Andrew, Glasgow, Scotland, assignor to Nicol & Andrew Limited, Glasgow, Scotland, a company of the United Kingdom of Great Britain and Northern Ireland Application June 10, 1955, Serial No. 514,673

Claims priority, application Great Britain June 10, 1954

7 Claims. (Cl. 51—184.1)

The subject of this invention is a honing device for use in honing external cylindrical surfaces in situ, e. g., the crank pins of marine engines and motor vehicles.

Figure 1A:
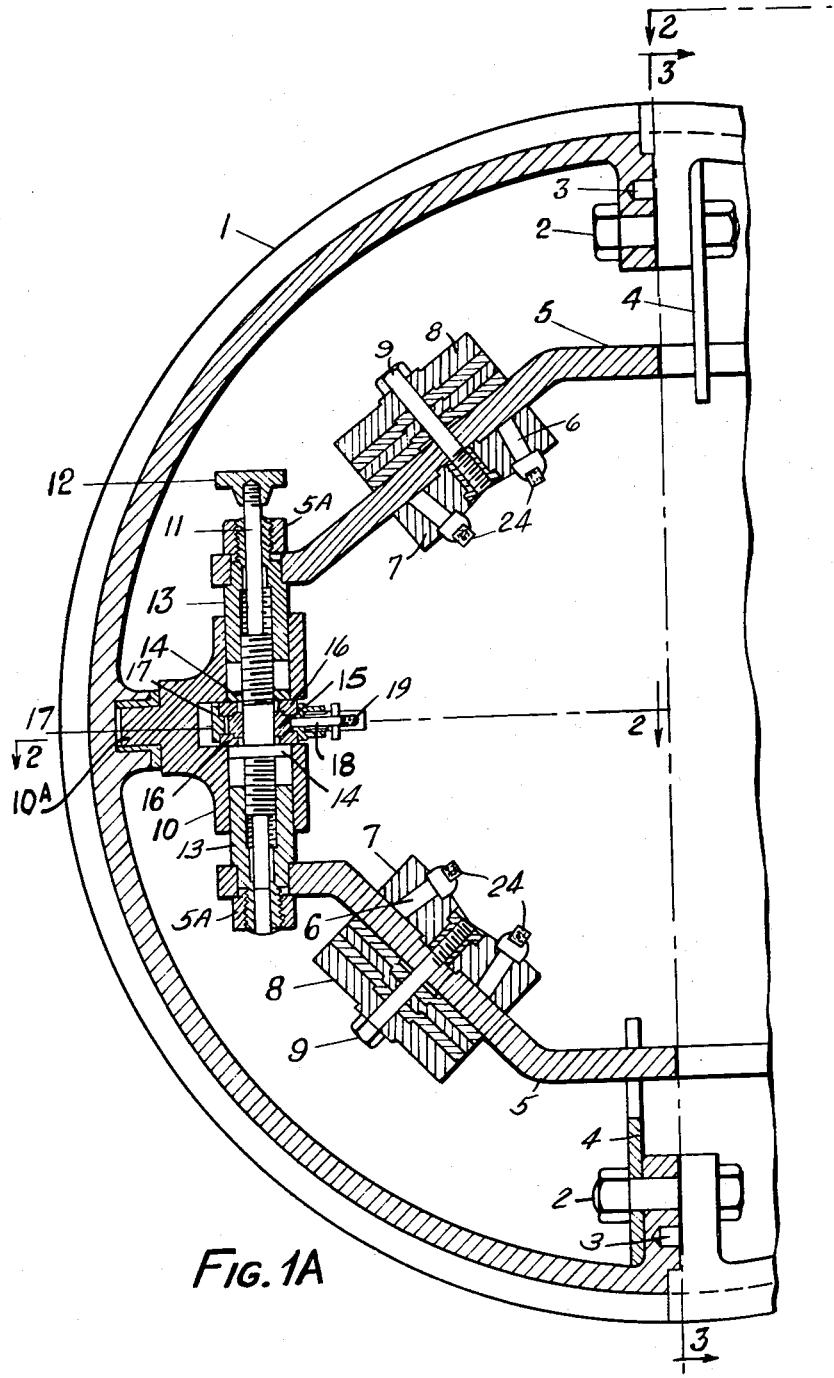
Figure 1B:
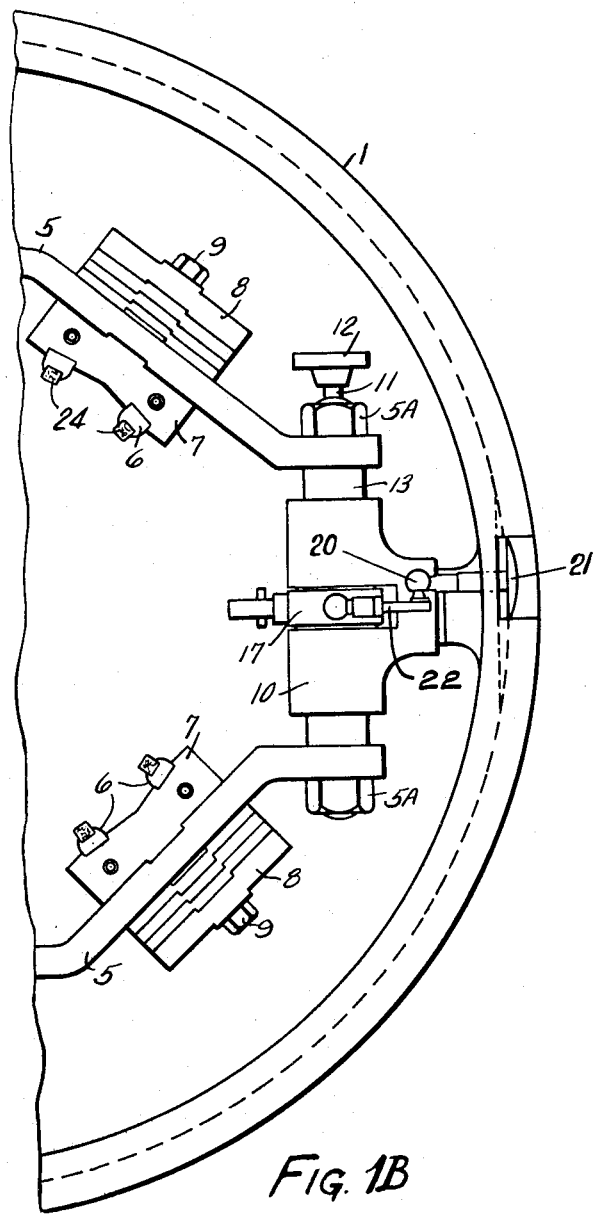
Figure 2:
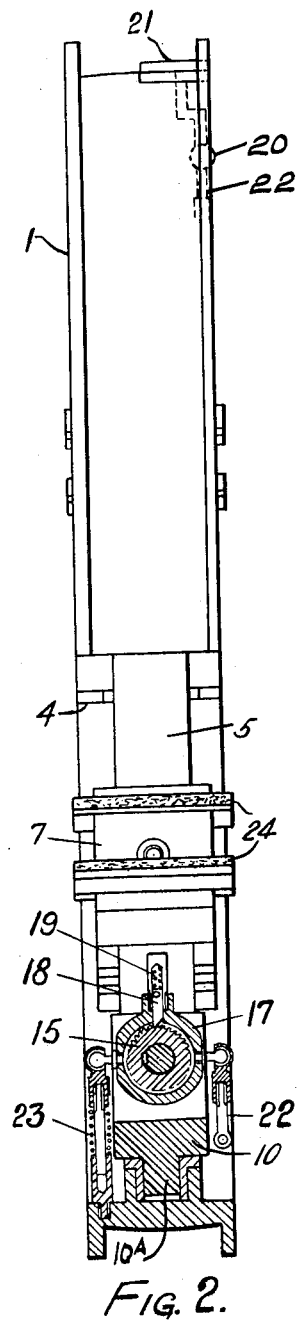
Figure 3:
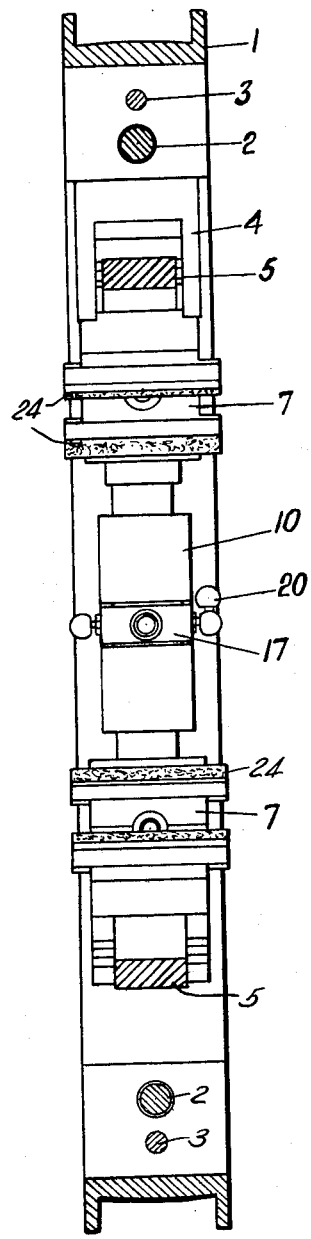

A practical embodiment of the invention is illustrated in the accompanying drawings in which Fig. 1 is a side elevation in half section of a honing device, Fig. 2 is a section through the line 2—2 in Fig. 1, and Fig. 3 is a section through the line 3—3 in Fig. 1.

In the drawings, 1 denotes an outer ring member in halves held together by bolts 2, the halves being located by dowels 3. 4 denotes bifurcated stop members projecting inwardly from the ring member 1 and engageable with a hone-supporting frame 5 supporting hone carriers 6 mounted in hone blocks 7, the hone blocks 7 being held to the hone-supporting frame 5 in association with packing pieces 8 and fastening bolts 9. The hone-supporting frame 5 is in two portions coupled to one another at their ends by turnbuckle devices each of which consists of a bracket 10 presenting a trunnion 10A engaged with a bearing in the outer ring member 1, a link member 11 screw-threaded at opposite ends with right and left hand screw threads and passing through the bracket 10, a hand wheel 12 fastened to the element 11, screw-threaded elements 13 fixed to the frame 5 by nuts 5A and engaged with the screw-threaded ends of the element 11, locking nuts 14, a ratchet wheel 15 located between thrust washers 16 and fastened to the link member 11, and a pawl carrier 17 supporting a pawl 18 urged by a spring 19 into engagement with the ratchet wheel 15. The pawl carrier 17 is coupled by a linkage including a coupling rod 22 and a ball joint connection 20 to a plunger 21 protruding from the periphery of the outer ring member 1. The pawl carrier 17 is spring-urged by a spring 23 to rotate in the direction to cause the plunger 21 to protrude from the periphery of the ring member 1. 24 denotes honing stones presented by the carriers 6.

In practice, when a shaft is to be ground, the portions of the outer ring member 1 and of the hone-supporting frame 5 are separated, and fitted around the shaft and then assembled, the only adjustment manually performed being a coarse adjustment of the positions of the hones by rotation of the hand wheels 12. A driving belt is fitted around the outer ring member 1 and is connected to driving means. During the first revolution of the outer ring member 1, each plunger 21 comes under the driving belt and is forced inwardly, thereby causing the pawl carrier 17 to rotate in opposition to the spring 23. The pawl 18 in engagement with the ratchet wheel 15 rotates the ratchet wheel 15 through part of a revolution thereby rotating the link member 11 engaging the screw-threaded elements 13 and causing the portions of the hone-supporting frame 5 to move towards one another and to cause the hones to move towards the shaft to be ground. When each plunger 21 moves out of engagement with the belt the associated pawl carrier 17 rotates in the reverse direction under the influence of the spring 23, and the pawl 18 slips over the teeth of the ratchet wheel 15. During the next revolution of the device when the plunger 21 comes into contact again with the driving belt the operation is repeated and the portions of the hone-carrying frame 5 are again advanced towards one another. This process is repeated until the hones are in contact with the shaft whereupon rotation by the pawl 18 of the element 11 and its attached ratchet wheel 15 is resisted and the plunger 21 is not moved inwardly. No further movement of the ratchet wheel 15 takes place until the hones wear, whereupon the periodic pressure of the driving belt on the plungers 21 rotates the ratchet wheels 15 to take up the wear. The hone-supporting frame 5 is free to swing through a small angle relatively to the outer ring member 1 on the trunnions 10A to accommodate itself to the work. The angle of swing is limited by the stop members 4. For honing work of considerable length in proportion to its diameter hones wider than the device may be fitted to the carriers, the honing device being moved axially along the work, the stop members 4 preventing the hone-supporting frame 5 from swinging to too great an extent relatively to the outer ring member 1 and damaging the work.

What is claimed is:

1. A honing device for use in honing external cylindrical surfaces in situ comprising an outer ring member arranged for reception of a driving belt, a hone-supporting frame carried by said ring member within said ring member, the hone-supporting frame being formed of two portions, turnbuckle devices coupling said portions to one another at their ends, said turnbuckle devices each including screw-threaded elements fixed to said hone-supporting frame, a link member screw-threaded at opposite ends with right and left hand screw threads and engaged with said screw-threaded elements, a ratchet wheel fastened to said link member between said screw-threaded elements, a pawl carrier, a pawl supported by said pawl carrier, said pawl being spring-urged into engagement with said ratchet wheel, and a plunger located at the periphery of said outer ring member, said pawl carrier being coupled to said plunger and being spring-urged to rotate in the direction to cause said plunger to protrude from the periphery of said ring member.

2. A honing device as claimed in claim 1 in which the ring member consists of mating separable portions.

3. A honing device as claimed in claim 1 in which the hone-supporting frame consists of mating separable portions.

4. A honing device as claimed in claim 1 in which the outer ring member is formed with sockets and the turnbuckle devices present trunnions engaging said sockets.

5. A honing device as claimed in claim 1 in which the hone-supporting frame presents carriers for reception of honing stones.

6. A honing device as claimed in claim 1 in which a hand wheel is fastened to the link member.

7. A honing device as claimed in claim 1 including stop members carried by the outer ring member and engageable with the hone-supporting frame.

No references cited.